United States Patent
Cunningham et al.

[15] 3,696,180
[45] Oct. 3, 1972

[54] PROCESS FOR PREPARING MICROPOROUS POLYURETHANE RESIN SHEETS BY CASTING THE RESIN ON A POROUS SINTERED THERMOPLASTIC POLYMERIC RESIN SUPPORT SURFACE

[72] Inventors: Victor Ralph Cunningham; Thomas Stanley Dodson, both of Dagenham Dock, England

[73] Assignee: Porous Plastics Limited, Essex, England

[22] Filed: May 11, 1970

[21] Appl. No.: 37,399

[30] Foreign Application Priority Data

Mar. 7, 1966 Great Britain.............9974/66
Jan. 11, 1967 Great Britain.............1610/67

Related U.S. Application Data

[63] Continuation of Ser. No. 620,659, March 6, 1967.

[52] U.S. Cl.................264/48, 260/2.5 AY, 264/41, 264/49, 264/126, 264/338, 264/DIG. 62
[51] Int. Cl. ...........................................B29d 27/04
[58] Field of Search....264/41, 49, 126, 212, 48, 338, 264/DIG. 62; 136/146; 260/2.5 AY

[56] References Cited

UNITED STATES PATENTS

| | | |
|---|---|---|
| 2,542,527 | 2/1951 | O'Conor Honey et al..............................264/49 |
| 2,707,201 | 4/1955 | Fernald et al............264/49 X |
| 2,810,932 | 10/1957 | O'Conor Honey et al..............................264/49 |
| 2,984,869 | 5/1961 | O'Conor Honey et al..............................264/49 |
| 3,123,654 | 3/1964 | Malischewski............264/126 |
| 3,190,765 | 6/1965 | Yuan......................264/49 X |
| 3,296,016 | 1/1967 | Murphy...................264/49 X |
| 3,297,805 | 1/1967 | Rottig......................264/126 |
| 3,414,642 | 12/1968 | Baum.......................264/126 |
| 3,418,168 | 12/1968 | Wentworth.............264/49 X |
| 2,983,960 | 5/1961 | Jilge............................264/48 |

FOREIGN PATENTS OR APPLICATIONS 639,553   4/1962   Canada.......................264/41

Primary Examiner—Philip E. Anderson
Attorney—Watson, Cole, Grindle & Watson

[57] ABSTRACT

In a method of making artificial leathers and other water vapor permeable flexible sheet materials, a layer of polymer-containing mixture adhering to a temporary support is coagulated by suitable liquid treatment, dried, and then stripped from the support.

2 Claims, 1 Drawing Figure

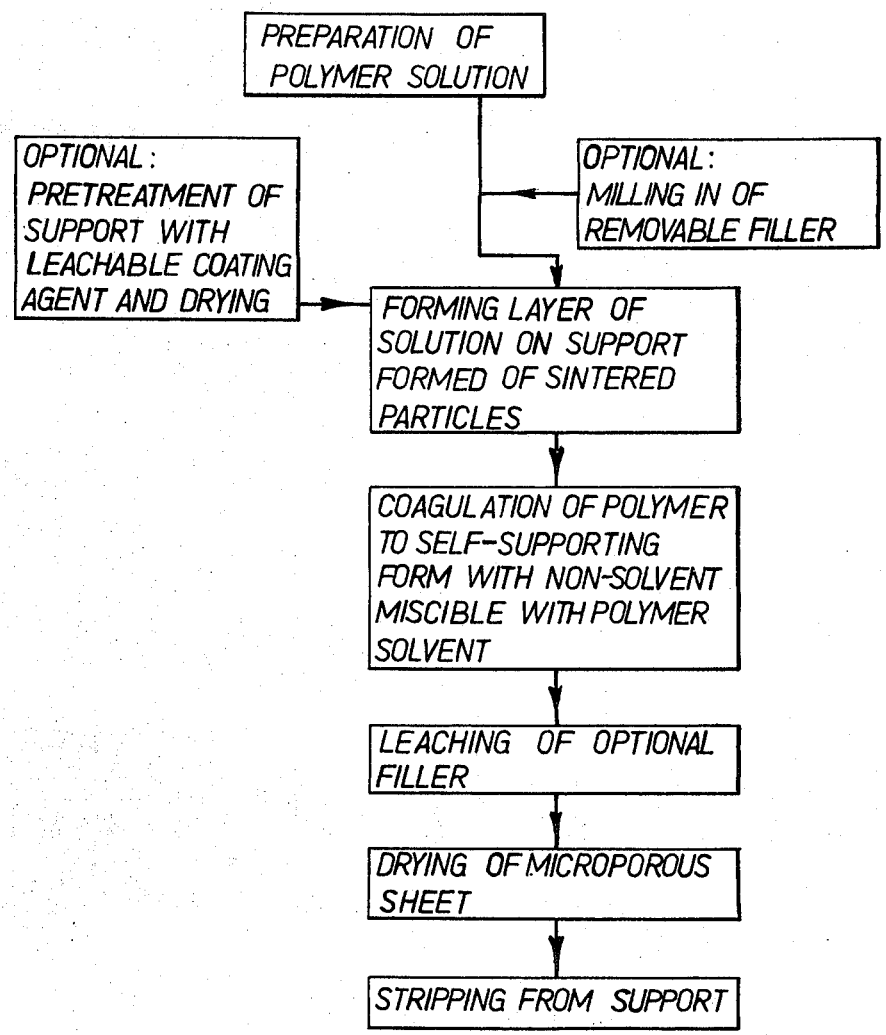

PROCESS FOR PREPARING MICRO-POROUS POLYURETHANE RESIN SHEETS BY CASTING THE RESIN ON A POROUS SINTERED THERMOPLASTIC POLYMERIC RESIN SUPPORT SURFACE

This is a continuation of copending application No. 620,659, filed Mar. 6, 1967.

This invention relates to the making of water vapor permeable flexible sheet materials.

The invention is concerned with methods of making water vapor permeable flexible sheet material by forming a mixture including at least one natural or synthetic polymeric plastics working material and a solvent for the working material, shaping the mixture, and removing the solvent by treating the shaped mixture with a coagulating liquid which is not a solvent for the working material, the choice of coagulating liquid and the time of treatment being selected to ensure that substantially all the solvent is removed so as to form the water vapor permeable sheet material.

In some cases it may be desirable to include in the mixture a removable solid filler ground to a narrow range of particle sizes. In such cases, the coagulating liquid should also be a solvent for the removable filler, and the filler should be removed during or after the coagulation of the working material. The mixture may comprise a polyurethane working material, NN-dimethylformamide as the solvent, and sodium chloride as the filler, whilst the solvent and filler leaching agent may be water. The filler may have a substantial number of particles whose diameters fall within the range 7–25 microns.

The mixture may be shaped by being formed as a layer on either a permanent support or a temporary support. For example a porous synthetic plastics material may be employed as the permanent support from which the vapor permeable layer is never removed. In the case of a temporary support a stainless steel conveyor or a sheet or solvent resistant synthetic plastics material or a sheet of release paper may be used.

It has now been found that very desirable materials can be made with a temporary support comprising a sheet formed of sintered particles which has a sufficiently rough surface to cause the mixture and also the coagulated working material to adhere to it, but from which that material is ultimately stripped.

According to the present invention a method of making a water vapor permeable flexible sheet material includes forming a spreadable mixture comprising a solution of a film forming flexible synthetic polymeric plastics working material in a solvent, forming a continuous layer of the mixture on a temporary support, treating the layer on the support with non-solvent for the working material, which is preferably a coagulating liquid which is at least partially miscible with the solvent for the working material, so as to coagulate the working material into a sheet, and remove substantially all the solvent, preferably by washing with fresh coagulating liquid or continuing the treatment, drying the resultant water vapor permeable flexible sheet material and stripping it from the temporary material such as high density polyethylene, as sold under the Registered trade mark VYON as 1/16 inch filter grade.

The temporary support may be formed by spreading an even layer of granules of polymeric plastics material on a smooth metal surface and then placing the smooth metal surface and the layer in a suitably heated oven to cause the granules to sinter, the surface of the sintered sheet which was in contact with the smooth metal surface being smoother than the other face of the sintered sheet and the layer of working material being formed on the smoother face of the sintered sheet.

In some circumstances it may be desirable to take steps to facilitate clean stripping of the material from the support, for example if the same support is to be used an increased number of times. For this purpose the support, before the material is applied to it, may be wetted with a solution of a substance which is soluble in the coagulating liquid, and then dried, so as to be left with a coating of the substance which is subsequently dissolved by the coagulating liquid, thereby facilitating the stripping of the sheet material from the support. For example when the coagulating liquid is water the support may be pretreated by immersion in an aqueous solution of sodium chloride. The invention may be put into practice in various ways and a number of specific examples will be described to illustrate the invention with reference to the accompanying flow diagram of the process. All parts are given as parts by weight. The process is illustrated by the accompanying flow diagram.

The water vapor permeability values (WVP) are expressed in grams/square metre/24 hours and are determined by the method described in British Standard Specification 3177/1959 but carried out at 38° C with a nominal humidity gradient of 100% relative humidity. The hydrostatic head values are expressed in mm. Hg. and are determined by the method described in British Standard Specification No. 2823/1957. Nominal pore sizes are expressed in microns and are determined by the method described in British Standard Specification No. 1752/1963 using N-propyl alcohol.

In the examples certain properties of the products are quoted.

Tensile strength, Initial modulus, Extension percent and Tear strength are measured on a Houndsfield Tensometer.

Tensile strength, extension percent and initial modulus are measured in a continuous test on a single sample.

The material to be tested has an L direction, the direction of travel of the material during its formation, and an X direction, the direction at right angles to the L direction. For each material separate tests are made in the L and X directions.

These are done on two samples 6 inches long and ½ inch wide cut from the material to be tested with the lengths of the samples parallel to the L and X directions of the material respectively.

The samples are mounted in the tensometer with their ends gripped in the jaws of the machine. The samples are then loaded to produce a constant rate of extension of 4 inches per minute.

The term Initial modulus, used herein, is defined as the load in lbs/inch width of the sample/mm. thickness required to produce a 5% extension in length under these loading conditions.

The term Tensile strength, as used herein, is defined as the load in lbs/inch width/mm. thickness at which the sample ruptures under these loading conditions.

The term Extension percent, as used herein, is defined as the % increase in length of the sample at the time of rupture.

Tear strength is measured on a specially shaped sample. As for the other three properties the samples are 6 inches long and ½ inch wide and are cut with their lengths in the L and X directions respectively. In addition a small notch is cut at the mid point of one side and a small corresponding bulge is formed opposite the notch and extending outwards from the other side. The samples are in fact punched out of the material to be tested.

The notch propagates a tear in the test and the term Tear strength, used herein, is defined as the load in lbs/mm. thickness required to rupture this sample.

The term "IM value" used herein, is defined as the load in lbs/inch width of the sample required to produce a 5% extension in length under these loading conditions. This term is used for composite articles which have structures which vary through their thickness. Similarly the terms "Tensile value" and "Tear value" are defined without reference to the thickness of the sample and are used for composite articles.

GENERAL DESCRIPTION OF THE PROCESS

With reference to the accompanying drawing, the process may be seen to consist of five main stages and three optional stages.

The main stages are:
1. preparing the polymer solution;
2. forming a layer of the solution on a porous support formed of sintered particles;
3. coagulating the polymer to self-supporting form with non-solvent miscible with polymer solvent;
4. drying the microporous sheet; and
5. stripping the sheet from the support.

The polymer solution can also have a removable filler milled into it prior to forming the layer on the support. This results in a second optional stage between the third and fourth main stages in which the filler is leached out.

The support can also be pretreated with a leachable coating agent and dried (as described in Example 4 below). This is the third optional stage.

Example 1
 Mixture 1
 Solvent: 75 parts N,N-dimethyl formamide
 Base layer working material: 25 parts A thermoplastic polyester-based polyurethane, the proprietary material sold by Elastollan Limited under the name ELASTOLLAN TN 61 EH98AK. This polyurethane is derived from a linear polyester containing hydroxyl groups which is produced by reacting adipic acid with ethylene glycol. This polyester has a molecular weight of approximately 2,000, a hydroxyl index around 50 and an acid number of 1. This polyester (1,000 grams) is heated to approximately 120° C with 1, 4-butylene glycol (90 grams). Both the polyester and the glycol are adequately dehydrated before being reacted together. Solid 4-4'-diphenylmethane-di-isocyanate (400 grams) is added to the heated mixture with vigorous stirring, which is continued until the solid has dissolved, the temperature reaching about 100° C. After about two minutes the liquid is poured on to plates preheated to approximately 110° to 130° C. After approximately 10 minutes the mass is stripped from the plates, allowed to cool to room temperature, and granulated in a conventional granulating machine. This material has a Shore hardness of 98 on the A scale at 25° C. A 10% by weight solution in dimethyl formamide at 25° C has a viscosity of the order of 15 to 30 centipoise.

The working material is dissolved in the solvent the first stage and a layer of Mixture 1 formed on a temporary support the second stage. This is provided by the smooth surface of a 1/16th inch sheet of sintered high density Ziegler polyethylene which has a nominal pore size of 50 microns. Such a product is sold by Porous Plastics Limited under the Registered Trade Mark VYON (filter grade). It is formed by spreading an even layer of Ziegler high density polyethylene granules on a smooth metal surface and then placing the smooth metal surface and the layer in a suitable heated oven to cause the granules to sinter. The surface of the resultant sintered sheet which was in contact with the smooth metal surface is smoother than the other face.

The layer of working material is formed on this temporary support by doctor knife coating using a gap setting of 0.095 inches. The material is then immersed in and washed with water at 70° C until all the working material has come out of solution and all the N,N'-dimethylformamide has been removed from the layer the third stage. This takes about 12 hours. The layer on the support is then dried at 100° C for 30 minutes the fourth stage. The layer is then stripped from the temporary support the fifth stage. The surface of the layer which was in contact with the support resembles the flesh surface of a natural leather and the material may thus find uses as a split suede leather.

The product of this example can be used as a clothing suede or as a shoe upper suede. It can also be used as a base layer in the production of a replacement material for grain leather. Improved wear characteristics can be obtained if a polyurethane working material having an increased hardness is used. But softer working materials can also find uses in the production of materials suitable for use in making gloves and upholstery materials.

The product of Example 1 has the following physical properties:
 Thickness — 1.25 mm.
 Nominal pore size — 0.9
 W.V.P. — 2,500
 Hydrostatic head — greater than 300 mm. Hg.
 Tensile strength — L 26 × 31
 Initial modulus — L 4.8 × 4.4
 Extension percent — L 300% × 335%
 Tear strength — L 9.0 × 9.0

EXAMPLE 2

The product of Example 1 has a tie layer formed on it and a surface zone formed on the tie layer.
 The tie layer The base layer still attached to the temporary support is doctor knife coated with a layer of the following mixture using a gap setting of 0.015 inches.
 Tie layer working material 25

A thermoplastic polyester based polyurethane, the proprietary material sold by B.F. Goodrich Chemical Company under the name ESTANE 5701 Fl.

Solvent — dimethylcyclohexanone 75
Removable filler — sodium chloride 75
ground to a particle size range of 20—25 microns The tie layer working material has a hardness of 90 on the Shore A scale in the solid continuous state at 25° C. The mixture is formed by triple roll milling followed by degassing under vacuum.

The layer is dried at 100° C for 15 minutes.

The surface coating

The dried surface of the tie layer is doctor knife coated with a layer of the following mixture using a gap setting of 0.035 inches.

| | |
|---|---|
| Surface working material Elastollan TN 61 EH98AK | 25 |
| Solvent—DMF | 75 |
| Removable filler—sodium chloride ground to a particle size range of 20–25 microns | 75 |
| Pigment | 1.25 |

The mixture is formed by triple roll milling and degassing under vacuum.

The composite sheet still attached to the temporary support is immersed in water at 20° C for 20 minutes and then washed in water at 80° C for 2 hours. It is then dried at 100° C for 1 hour, and then stripped from the temporary support.

The product of this example resembles a natural calf leather and can be used as a replacement for such a material.

The product has the following physical properties.

Thickness — 1.6 mms.
Tensile value — L 80 — 72
IM value — L 11 × 10
Extension percent — L 350 × 330

EXAMPLE 3

A 30% by weight solution (based on the total weight of the solution) in dimethyl formamide of working material ELASTOLLAN TN61 EH98AK was prepared in a Silverson high speed propeller mixer, keeping the temperature of the mixture below 50° C the first stage. Salt (sodium chloride) was mixed into the solution to give a ratio of salt to working material of 1.78:1, and the mixture was then milled on a Torrence 3-roll mill and subsequently degassed the first stage. The formulation was then hand doctor-knife coated on to the smoother surface of a support formed of low permeability 1/16 inch porous sintered high density polyethylene sold under the Registered Trade Mark VYON (filter grade) the second stage and immersed in water at 40° C, coated-face downwards, to coagulate the polymer the third stage. This treatment was continued until substantially all the dimethyl formamide and salt the second optional stage had been removed from the sample which was then dried at 90° C the fourth stage, and stripped from the support the fifth stage.

The particle size of the salt was 13 microns as measured by means of a Photo-extinction Sedimentometer manufactured by Evans Electro Selenium Ltd., Model No. 41 used in accordance with the manufacturers' instructions based on papers by H.E. Rose in Engineering of 31st March and 14th April, 1950 and Nature of 1952, Volume 169 page 287.

Example 4

A 30% by weight solution of sodium chloride was prepared by dissolving the salt in hot water and allowing the solution to cool.

The temporary support of Example 1 was then wetted with the solution and dried at 80° C for about 30 minutes the third optional stage.

The procedures of Examples 1, 2 and 3 were then repeated using this pretreated support. The temporary support was found to be re-usable an increased number of times when this procedure was used, thus effecting an economy in the process. The product still had the desirable flesh surface appearance on the face which had been in contact with the support.

We claim:

1. In the method of making a microporous flexible artificial leather sheet material which includes forming a spreadable mixture comprising a solution of a film forming flexible synthetic polymeric plastics working material in a liquid solvent as a continuous layer on a porous support, said working material consisting essentially of thermoplastic polyester-based polyurethane and said liquid solvent consisting essentially of NN-dimethylformamide, treating the composite of said layer and the support with liquid non-solvent coagulant for the working material so as to coagulate the working material into a sheet and remove substantially all the solvent, and drying the resultant microporous water vapor permeable flexible sheet material wherein the improvement comprises employing as the support a porous sheet of sintered powdered or granulated thermoplastic organic polymeric resin material permeable to liquid, and stripping said sheet from said porous permeable support, at a stage after said coagulation into sheet, so that when the sheet is stripped from the support, the surface of the sheet which was in contact with said porous permeable support has a fibrous appearance imparted to it so that it resembles a suede leather or the flesh surface of natural leather, said support being resistant to said solvent and said coagulant.

2. A method as claimed in claim 1 in which the support is formed by spreading an even layer of particles of thermoplastic organic polymeric plastics resin material on a smooth metal surface and then placing the smooth metal surface and the layer in a suitably heated oven to cause the particles to sinter, the surface of the sintered sheet which was in contact with the smooth metal surface being smoother than the other face of the sintered sheet and the layer of base zone working material being formed on the said smoother face of the sintered sheet.

* * * * *